(12) United States Patent
Kasapi

(10) Patent No.: US 6,564,036 B1
(45) Date of Patent: May 13, 2003

(54) MODE SWITCHING IN ADAPTIVE ARRAY COMMUNICATIONS SYSTEMS

(75) Inventor: Athanasios A. Kasapi, San Francisco, CA (US)

(73) Assignee: ArrayComm, Inc., San Jose, CA (US)

( * ) Notice: Subject to any disclaimer, the term of this patent is extended or adjusted under 35 U.S.C. 154(b) by 297 days.

(21) Appl. No.: 09/676,886

(22) Filed: Sep. 29, 2000

(51) Int. Cl.$^7$ ................................................. H04K 3/00
(52) U.S. Cl. ........................ 455/1; 455/562; 455/67.1; 455/67.3
(58) Field of Search ................................. 455/562, 561, 455/67.1, 67.3, 1, 63

(56) References Cited

U.S. PATENT DOCUMENTS

| | | | |
|---|---|---|---|
| 5,515,378 A | | 5/1996 | Roy, III et al. |
| 5,592,490 A | * | 1/1997 | Barratt et al. ............... 370/310 |
| 5,615,409 A | | 3/1997 | Forssen et al. |
| 5,754,138 A | | 5/1998 | Turcotte et al. |
| 5,822,429 A | * | 10/1998 | Casabona et al. ........... 380/252 |
| 6,061,023 A | | 5/2000 | Daniel et al. |
| 6,070,071 A | * | 5/2000 | Chavez et al. .............. 455/562 |
| 6,078,823 A | * | 6/2000 | Chavez et al. .............. 455/562 |
| 6,122,260 A | | 9/2000 | Liu et al. |
| 6,233,466 B1 | * | 5/2001 | Wong et al. ................. 455/562 |
| 6,347,234 B1 | * | 2/2002 | Scherzer ..................... 455/562 |

FOREIGN PATENT DOCUMENTS

| | | |
|---|---|---|
| WO | WO 97/02262 | 7/1996 |
| WO | WO 97/08849 | 3/1997 |

OTHER PUBLICATIONS

Ottersten, B., "Array Processing for Wireless Communications," Proc. 8th IEEE Signal Processing Workshop on Statistical Signal and Array Proc., Jun. 1996, pp. 466–473.

Farsakh et al., "A Real Time Downlink Channel Allocation Scheme for an SDMA Mobile Radio System," IEEE International Symposium on Personal, Indoor and Mobile Radio Communications, vol. 3, Oct. 18, 1996, pp. 1215–1220.

Farsakh et al., "Channel Allocation and Downlink Beamforming in an SDMA Mobile Radio System," PIMRC '95, Wireless: Merging onto the Information Superhighway, 6th IEEE International Symposium on Toronto, Ont., Canada, Sep. 27–29 1995, pp. 687–691.

Gerlach et al., "Base Station Transmitter Antenna Arrays with Mobile to Base Feedback," IEEE Asilomar Conference on Signals, Systems & Computers, 1993, pp. 1432–1436.

\* cited by examiner

*Primary Examiner*—Thanh Cong Le
*Assistant Examiner*—Lana Le
(74) *Attorney, Agent, or Firm*—Blakely Sokoloff Taylor & Zafman, LLP

(57) ABSTRACT

A method and system for providing selective interference mitigation (or nulling) in an adaptive array system. A communication device, typically employing an adaptive array, determines an indication of signal reception quality for a first remote user terminal in communication with the communication device. The communication device provides a first mode of operation wherein a first amount of nulling with respect to at least one interfering source is generated by the communication device. In addition, the communication device provides a second mode of operation characterized by generating a second amount of nulling with respect to the at least one interfering source, wherein the second amount of nulling is relatively greater than the first amount of nulling. Based on the relative signal reception quality indication, the communication device selects one of the first and second modes of operation.

36 Claims, 3 Drawing Sheets

MODE SWITCHING IN ADAPTIVE ARRAY COMMUNICATIONS SYSTEMS

FIELD OF THE INVENTION

The present invention relates to the field of wireless communications systems, and in particular, to a method and system for selecting between transmission modes of a communication device to improve performance.

BACKGROUND OF THE INVENTION

One advance in increasing the capacity of communication systems has been in the area of resource sharing or multiple access. Examples of multiple access techniques include code division multiple access (CDMA), frequency division multiple access (FDMA), and time division multiple access (TDMA). For example, in a TDMA system, each remote user terminals communicates with a hub communication device (e.g., a base station) in a frequency channel shared with other remote user terminals, but in its own (i.e., non-overlapping) time slot. As such, in a TDMA system, multiple remote user terminals may communicate with the hub communication device within the same frequency channel, but within non-overlapping time slots. (The term "channel" as used herein refers to any one or a combination of conventional communication channels, such as frequency, time, code channels).

Although antennas have sometimes been one of the neglected components of wireless systems, relatively recent development in the field of (adaptive) antenna arrays and "smart antennas" have not only realized significant improvements in geographic capacity, but also in signal-to-noise ratio (SNR), interference reduction, directionality, spatial diversity, power efficiency, and security. Accordingly, employment of antenna arrays has been proposed in a number of different wireless applications, including, but not limited to, radio communication systems, cellular systems, television broadcasting, paging systems, medical applications, etc.

Antenna arrays typically include a number of antennas that are spatially separated and coupled to one or more processors. Adaptive antenna arrays, or simply, adaptive arrays, periodically analyze the signals received from each of the antennas in an array to distinguish between one or more desired signals (e.g., from a desired source, such as cellular telephone or other remote user terminal) and one or more undesired signals (e.g., interference from remote user terminals sharing the same or adjacent frequency, interference from other radio frequency (RF) emissions overlapping in channel, Johnson noise, multipath, other interference sources, etc). In doing so, adaptive array systems generally compute uplink and downlink "weights," which include information about how to transmit (in the case of a downlink weight) and how to receive (in the case of an uplink weight) to diminish gain in the direction of one or more interfering sources, while enhancing gain in the direction of a desired source. Thus, the weight values describe the uplink and/or downlink beamforming strategy for adaptive array systems. It should be appreciated herein that adaptive array systems may be switched beam or adaptive, wherein the latter case has a virtually infinite number of beamforming patterns that can be varied adaptively based on changing signal environment.

Because adaptive array systems may sometimes be able to distinguish between spatially distinct sources (e.g., two cellular user units at different locations), such systems are sometimes referred to as "spatial processing" or "spatial division multiple access (SDMA)" systems. In general, adaptive array systems provide relatively significant improvement in performance relative to single antenna element systems.

FIG. 1A is a diagram depicting a simplified radiation pattern of an antenna array system, according to the prior art. In the system shown in FIG. 1A, an antenna array 10 transmits (downlink) signals to and/or receives (uplink) signals from a desired source 12, such as a mobile or stationary remote user terminal (e.g., a cellular voice and/or data communication device, a PDA having wireless capability, etc.). As shown, a beamforming pattern 8, which represents the transmission and/or reception directional gain pattern (depicted for only two dimensions) for the antenna array 10, includes a region of enhanced gain 6, as well as a region of relatively minimized gain or "null" region 2 and another region of relatively minimized gain or null 4.

The null regions 2 and 4 represent one of the advantages of adaptive arrays and "smart antenna" processing. In particular, each of the nulls 2 and 4 represent a represent a region or direction of relatively minimized gain with respect to the beamforming pattern of the antenna array 10. As such, the antenna array 10 typically directs a null in the direction of an interfering source. To this end, the null 2 is directed toward an interfering source 14, while the null 4 is directed to the interfering source 16. The interfering sources 14 and 16 each may represent a moving car, another mobile or stationary remote user terminal in communication with the antenna array 10 or another communication device (e.g., a base station that may or may not include an antenna array), etc., which, may cause interference. As such, null generation may be viewed as interference mitigation, and each "null region" may be referred to as an interference mitigated region.

By enhancing the gain in the direction of desired source, while diminishing (and ideally reducing to zero) the gain in the direction of one or more interfering sources, the antenna array 10 may "directionally" receive and transmit signals, and as such, increase system capacity, decrease interference to the desired source(s), etc.

FIG. 1B is a graphical representation of a beamforming pattern for the antenna array 10 shown in FIG. 1A, according to the prior art. In FIG. 1B, the level of the transmission (downlink) and reception (uplink) gain of the antenna array 10 is depicted on the vertical axis and (spatial) direction is shown on the horizontal axis. As shown, there is relatively greater gain in the direction of the desired source 12, which corresponds to the enhanced gain region 6, than there is toward the interfering source 14, which corresponds to the null region 2, or the interfering source 16, which corresponds to the null region 4.

It should be appreciated that the term "null" as used in the context of adaptive array systems does not necessarily mean, and often does not mean, a region of zero electromagnetic energy, since nulls may often include some level of gain, though typically less than the enhanced region 6. Ideally, a communication device employing an adaptive array would direct a null having zero gain toward an interfering source. Furthermore, the closer the gain value of a null is to zero, the more intense or "deep" the null is. Thus, the "amount of nulling" that an antenna array or adaptive array system may generate may be defined one or both the number of nulls and the intensity of such nulls, such that the greater the amount of nulling, the greater the number of nulls generated and/or the more intense/deep one or more nulls are. As shown in FIG. 1B, for example, the null 2 is less intense than the null 4, since the latter represents less gain (and greater nulling intensity).

Unfortunately, performing interference mitigation (or "nulling") generally diminishes the overall transmit and/or receive power of an antenna array system. In general, the number of nulls an adaptive array can generate is limited. For example, if a base station employing an antenna array directs relatively maximum power to a desired remote user terminal, such that a few, none, or relatively less intense nulls are generated, other remote user terminals, either in communication with the base station or another base station, may experience interference because of the relatively high transmission power used to communicate with the desired source. The interference may be especially problematic in systems where one or more base stations support spatial channels—i.e., when two or more remote user terminals may simultaneously share the same carrier frequency and/or time slot for communication with the base station. On the other hand, if the base station uses a downlink beamforming strategy that directs relatively less gain toward the desired remote user terminal, for example, due performing a relatively greater amount of nulling, then the desired remote user terminal may suffer from fading or other types of performance degradation due to insufficient transmit power by the base station, even though the effect interference to other sources may be diminished.

Thus, what is desired is method and system that overcomes the above-mentioned or other effects associated with performing interference mitigation in adaptive array systems. THIS PAGE INTENTIONALLY LEFT BLANK

SUMMARY OF THE INVENTION

The present invention relates to a method and apparatus for providing selective interference mitigation (or nulling) in an adaptive array system. In accordance with one embodiment of the invention, a communication device, typically employing an adaptive array, determines an indication of signal reception quality for a first remote user terminal in communication with the communication device. The communication device provides a first mode of operation wherein a first amount of nulling with respect to at least one interfering source is generated by the communication device. In addition, the communication device provides a second mode of operation characterized by generating a second amount of nulling with respect to the at least one interfering source, wherein the second amount of nulling is relatively greater than the first amount of nulling. Based on the relative signal reception quality indication, the communication device selects one of the first and second modes of operation.

DETAILED DESCRIPTION

The present invention provides a method and apparatus to selectively perform interference mitigation (or "nulling") based on determination of the quality of communication between at least one remote user terminal and at least one hub communication device.

It will be appreciated that the invention may be utilized in various types of wireless architectures and applications. For instance, the invention may be utilized in time division duplex (TDD) or frequency division duplex (FDD) systems or other wireless architectures. Similarly, the invention may be employed in conjunction with TDMA, CDMA, and/or FDMA access protocols. In one embodiment, the invention is employed in the Personal Handyphone System (PHS). In other embodiments, the invention may be employed with various types of wireless systems, not necessarily limited to cellular systems.

As used herein, a "base station" differs from a remote user terminal, to the extent that a base station may process signals from one or multiple remote user terminals at the same time, and the base station is typically coupled to a network (e.g., the public switched telephone network (PSTN), the Internet, and/or other voice and/or data network). The invention is not limited, however, to any one type of wireless communication system or device, but may find use in a variety of wireless applications utilizing antenna arrays to perform "directional" interference mitigation (or nulling). Although one embodiment of the invention is described with reference to a base station that includes an adaptive array, it should be appreciated that one or more remote user terminals may also include an antenna array. As such, the method and apparatus of the invention may also be embodied, at least in part, by a remote user terminal.

Figure 1A:
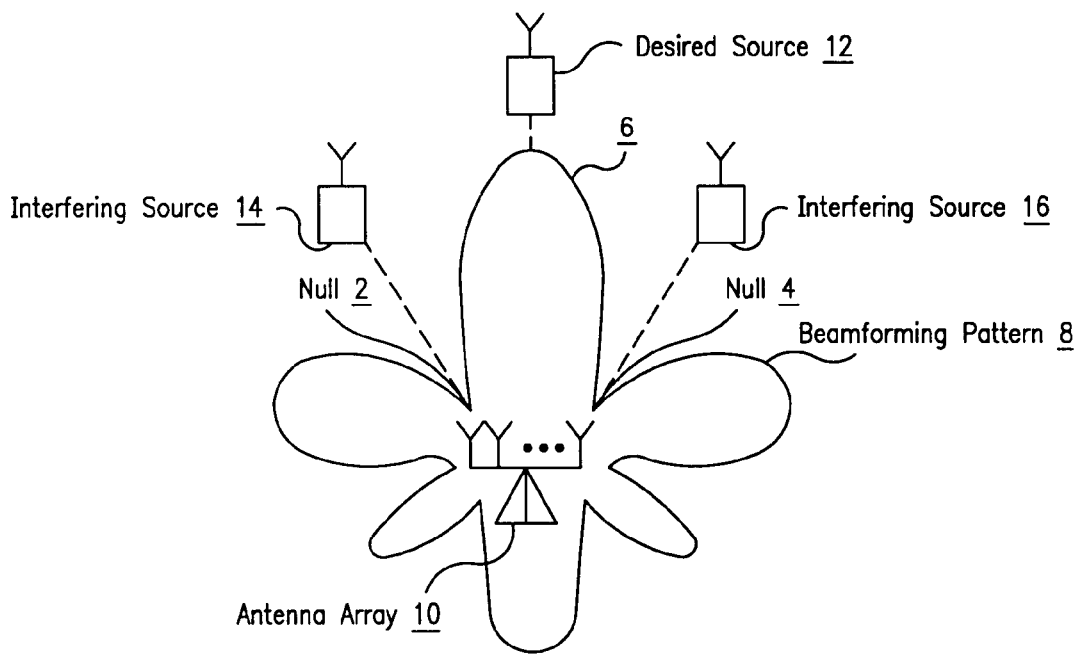
FIG. 1A is a diagram depicting a simplified radiation pattern of an antenna array system, according to the prior art.
Figure 1B:
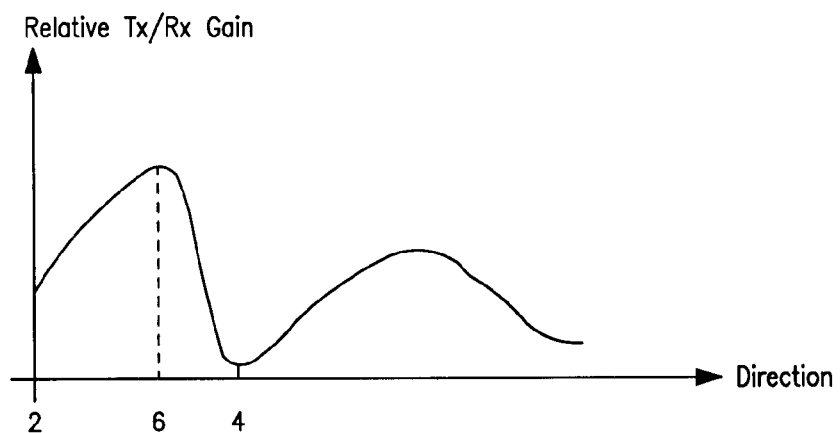
FIG. 1B is a graphical representation of a beamforming pattern for the antenna array 10 shown in FIG. 1A, according to the prior art.
Figure 2:
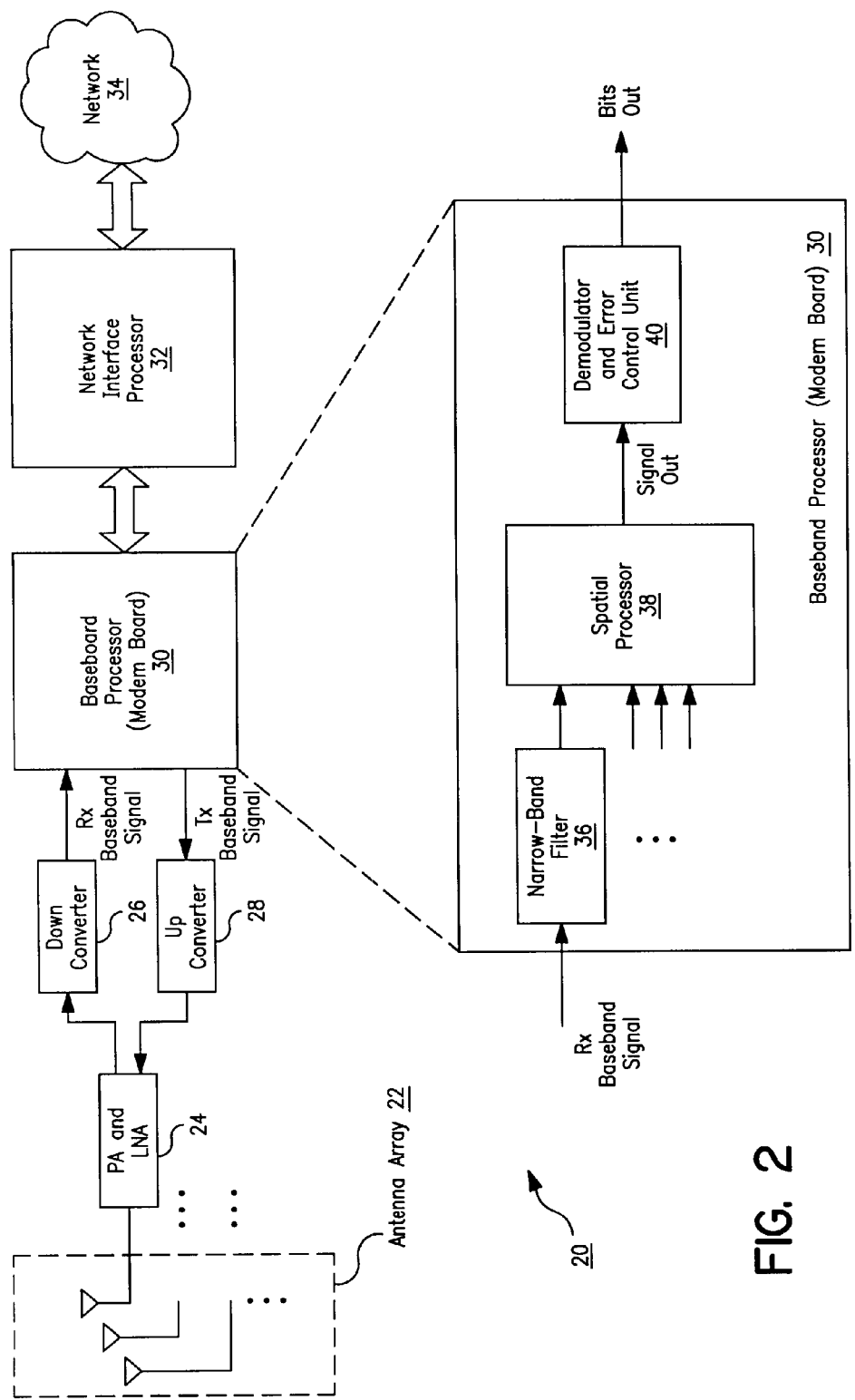
FIG. 2 is a block diagram of an adaptive array system employing an adaptive interference mitigation mechanism, according to one embodiment of the invention.

FIG. 2 is a block diagram of an adaptive array system employing an adaptive interference mitigation mechanism, according to one embodiment of the invention. As shown, a system 20, which may be part of a base station, in one embodiment, includes an antenna array 22, which in turn includes a number of antenna elements. The antenna array 22 is utilized for transmitting a downlink signal to a remote user terminal and for receiving an uplink signal from the remote user terminal. Of course, the system 20 may communicate with several remote user terminals, and as such, may process a number of signals each associated with a remote user terminal or other signal source. Furthermore, the system 20 may be employed in each of several base stations in a wireless communication network, where each base station uses a given set of channels to communicate with remote user terminal units within a given geographic region. Such remote user terminals may be stationary or mobile, and may communicate voice and/or data with the system 20.

As shown in FIG. 2, each antenna element of the antenna array 22 is coupled to a power amplifier (PA) and low-noise amplifier (LNA) 24. The PA/LNA 24 of each antenna element amplifies the received (uplink) and/or transmitted (downlink) signal. As shown, each PA/LNA 24 is coupled to a down-converter 26 and an up-converter 28. The down-converter 26 converts the "raw" signal received by the antenna array 22 on a carrier frequency into a receive (Rx) baseband signal, which is provided to a baseband processor (also referred to as a modem board) 30. The up-converter 28, conversely, converts a transmit (Tx) baseband signal provided by the baseband processor 30 into a carrier frequency transmit signal, which is provided to the PA/LNA 24 to be transmitted (e.g., to a remote user terminal). Although not shown, analog-to-digital conversion (ADC) and digital-toanalog (DAC) circuitry may be coupled between the down-converter 26 and the baseband processor 30 and between the up-converter 28 and the baseband processor 30, respectively.

The baseband processor 30 typically includes hardware (e.g., circuitry) and/or software (e.g., machine-executable code/instructions stored on a data storage medium/device) to facilitate processing of received (uplink) and transmitted (downlink) signals. In accordance with the embodiment of the invention shown in FIG. 2, the baseband processor 30 includes at least one narrow-band filter 36 to filter received signals (e.g., to decrease interference between the uplink signals of two or more remote user terminals in communication with the system 20). The filtered signal from the narrow-band filter 36, in turn, is provided to a spatial processor 38.

The spatial processor 38 typically includes at least one general purpose and/or digital signal processors (DSP) to facilitate spatial or spatio-temporal processing. As such, the spatial processor 38, based on the spatio-temporal characteristic(s) of one or more downlink signals, is able to transmit and receive signals between one or more remote user terminals in a spatially selective manner. Accordingly, in one embodiment, two or more remote user terminals may simultaneously occupy the same carrier frequency channel but may be distinguishable by the system 20 based on their unique spatial or spatio-temporal characteristic(s). One example of a spatial characteristic is direction of arrival (DOA) or angle of arrival (AOA). Other types of spatial characteristics know in the art of adaptive arrays may be employed in conjunction with the present invention.

In general, the antenna array 22 facilitates transfer of signals between the system 20 and a desired source, for example, a remote user terminal. For example, the antenna array will transmit downlink signals to the remote user terminal, while receiving uplink signals from the remote user terminal. The processor 38 will determine the spatial characteristic(s) of the uplink signal from the (desired) remote user terminal, as well as the spatial characteristic(s) of one or more interfering sources. Based on such characteristics, the system 20 will perform beamforming to enhance gain in the direction of the desired remote user terminal, while relatively minimizing gain (or nulling) in the direction of the one or more interfering sources.

As shown in FIG. 2, the spatial processor 38 is further coupled to a demodulator and error control unit 40, which receives an "extracted" or "desired" signal or set of signals from the spatial processor 38, and outputs the extracted signal to a network processor 32. The unit 40 may perform error correction, provide packet overhead, and/or perform other processing before outputting the uplink information in the form of digital data to the network processor 32.

The network processor 32, which may or may not constitute part of the system 20, facilitates the transfer of information between the system 20 and an external network 34. For example, a remote user terminal may include a cellular telephone, two pager, or other communication device whose user is in communication with a hard-wired telephone user at a remote location, in which case the network interface processor 32 may perform processing to facilitate routing the signals between the remote user terminal(s) and the network 34, which in this example may include the public switched telephone network (PSTN), the Internet, and/or other voice and/or data network. Similarly, the remote user terminal may include a computing device (e.g., a portable digital assistant, a laptop/notebook computer, a computing cellular telephone handset, etc.), along with a Web-browser, in which case the network 34 may represent the Internet and the network interface processor may facilitate communication between the remote user terminal (via the system 20) and one or more servers or other data processing systems coupled to the Internet. As such, voice and/or data (e.g., video, audio, graphics, text, etc.) may be transferred between the system 20 (and one or several remote user terminals in communication therewith) and an external network 34.

In accordance with one embodiment of the invention, the system 20 provides an adaptive selective nulling mechanism based on a determination of the reception quality for a (desired) remote user terminal. The determination of the reception quality for the desired remote user terminal may be based on a direct measurement by the remote user terminal of a downlink signal transmitted from the system 20 to the remote user terminal or a more indirect measurement by the system 20 of an uplink signal transmitted from the remote user terminal to the system 20. For example, the remote user terminal may measure the received signal strength of a downlink signal transmitted by the systems 20 and indicate the measured signal reception quality to the system 20 as information contained in an uplink signal transmitted to the system 20 by the remote user terminal. It should be appreciated that alternative embodiments of the invention may use received signal strength (RSSI) and/or one or more measures of signal quality or strength (e.g., based on signal-to-noise ratio, bit error rate, or some other reception signal quality indication).

On the other hand, the system 20 may include measurement circuitry to measure the reception strength or other quality of an uplink signal that was transmitted by the remote user terminal, and use such measurement of the uplink signal received by the system 20 as an indirect estimate of the (downlink) signal reception quality for the remote user terminal. In other words, either or both the system 20 and the remote user terminal in communication with the system 20 may measure or otherwise determine the reception quality of the remote user terminal. Furthermore, such reception quality may be determined by the remote user terminal and/or the system 20 based on one or a combination of various signal quality indications, including, but not limited to, signal-to-noise ratio (SNR), energy per bit divided by the noise plus interference spectral density ($E_b/N_0$), received signal strength indication (RSSI), signal-to-interference plus noise ratio (SINR), bit error rate (BER), etc.

In accordance with one embodiment of the invention, based on the indication of the signal reception quality for the remote user terminal, the system 20 will select a mode of operation to provide an adequate transmission and/or reception gain toward the desired remote user terminal while attempting to provide relatively optimum interference mitigation (or nulling) toward one or more interfering sources. In one embodiment, if the signal reception quality of the (desired) remote user terminal is relatively poor, for example, as compared with a threshold value, the system 20 will operate in a first mode where the system 20 will generate a relatively small amount of nulling to direct toward one or more interfering sources, which may include one or more remote user terminals in communication with the system 20 or some other base station(s). On the other hand, if signal reception quality of the remote user terminal is relatively high as compared with a threshold, then the system 20 operate in a second mode, where the amount of nulling is greater relative to the first mode. In one embodiment, not only may the amount of nulling be increased in this second mode, but the overall transmission power of the system 20 with respect to the desired remote user terminal may be decreased to further reduce interference to other remote user terminals or other sources. Depending on particular system constraints wherein the present invention may be employed, such as a maximum allowable BER in a data communication-supported system, the threshold used to determine between the first and second modes, including determining the transmit power to direct to the desired remote user terminal and/or the amount of nulling to direct toward one or more interfering sources, may be chosen accordingly.

For example, in one embodiment where the system 20 supports spatial channels, such that two or more remote user terminals may communicate with the system 20 on the same carrier frequency channel and/or time slot, selecting between the first and second modes may significantly reduce co-channel interference for the two remote user terminals while generally ensuring that a desired remote user terminal receives downlink signals with sufficient power.

The system 20, in one embodiment of the invention, may adapt to a changing reception quality at the (desired) remote user terminal each time signals are transferred between the system 20 or at certain time intervals. For instance, the remote user terminal's signal reception quality may be determined each time signals are transferred therebetween, and the system 20 may operate in one of the two modes based thereon. On the other hand, at some regular time interval (e.g., after a given number of uplink and/or downlink transfers), the signal reception quality may be determined and the appropriate mode selected.

Figure 3:
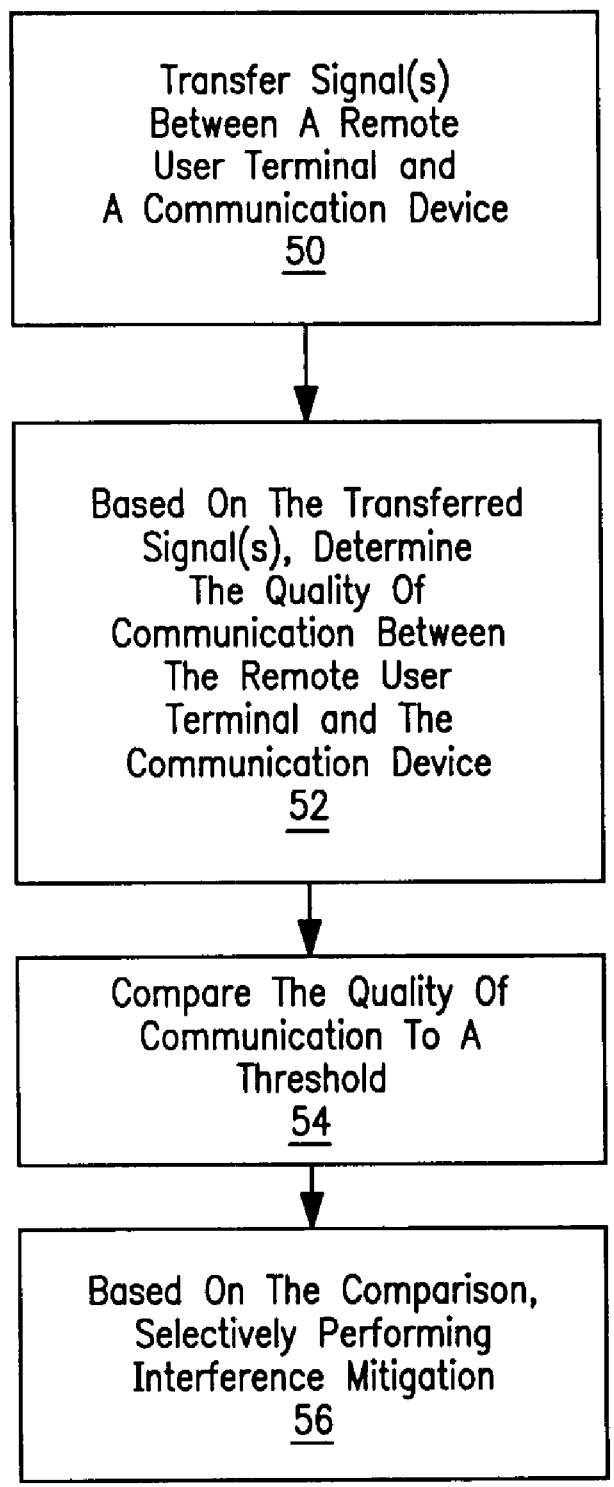
FIG. 3 is flow diagram of a method for selectively performing interference mitigation, based on determination of the quality of communication between a remote user terminal and a communication device, for example, a base station, according to one embodiment of the invention.

FIG. 3 is flow diagram of a method for selectively performing interference mitigation, based on determination of the quality of communication between a remote user terminal and another communication device, for example, a base station, according to one embodiment of the invention.

At block 50, one or more signals are transferred between a remote user terminal and a communication device, which in this embodiment, is a base station employing an antenna array. At block 52, based on the transferred signal(s), the base station determines the quality of communication between the remote user terminal and the communication device. In particular, the base station, either directly or indirectly, determines the relative reception quality of the remote user terminal. For example, in CDMA systems handoffs between base stations are typically remote user terminal-assisted. A remote user terminal may make measurements of the signal quality of the signal it receives from one or more base stations, and report these measurements to the base station with which it is currently communicating.

On the other hand, the remote user terminal may directly determine the quality of communication by measuring at least one downlink signal from the base station. For example, in one embodiment of the invention utilizing the IS-95 CDMA air interface standard, a protocol known as a Pilot Measurement Request Order Message (PMROM) is provided for reporting the signal strength received at the remote user terminal. When a base station sends a PMROM on a pilot channel, the remote user terminal responds with a Pilot Strength Measurement Message,(PSMM) that contains a measurement of the signal strength of the pilot channel identified in the PMROM as measured at the remote user terminal. In this embodiment, the base station can use the directly measured signal strength as a basis to select between two or more modes of operation.

At block 54, the base station compares the quality of communication to a threshold. In an alternative embodiment where the remote user terminal directly measures its signal reception quality, the remote user terminal may compare the quality to a threshold, and provide the result of the comparison to the base station, for example, as data that indicates to the base station whether to operate in the first or second mode. As such, it should be appreciated that not only may the remote user terminal's signal reception quality be measured directly by the remote user terminal or indirectly by the base station, but the indication of, or even the selection of, the mode of operation based on such quality may be done by the remote user terminal or the base station.

At block 56, based on the comparison, the base station selectively performs interference mitigation. In other words, based on the indication of the signal reception quality for the remote user terminal, the base station selects a mode of operation to provide a relatively adequate transmission and/or reception gain toward the desired remote user terminal while attempting to provide relatively optimum interference mitigation (or nulling) toward one or more interfering sources. In one embodiment, if the signal reception quality of the (desired) remote user terminal is relatively poor, for example, as compared with a threshold value, the base station will operate in a first mode where base station generates a relatively small amount of, or even no, nulling. On the other hand, if the signal reception quality of the remote user terminal is relatively high, then the base station will operate in a second mode, where the amount of nulling is greater relative to the first mode. In one embodiment, not only may the amount of nulling be increased in this second mode, but the overall transmission power of the base station with respect to the desired remote user terminal may be decreased to further reduce interference to other remote user terminals or other sources.

As such, in one embodiment of the invention, a base station, when communicating with a remote user terminal or other desired source, selectively determines a downlink transmission mode from a plurality of downlink transmission modes for transmitting downlink signals to a remote user terminal.

In a first mode, the base station may optimize the downlink transmissions such that maximum or near maximum power is directed to the desired source, while the amount of nulling toward one or more interfering sources is relatively attenuated. However, this first mode may cause increased interference to other remote user terminals. In one embodiment of the invention, where two or more remote user terminals may share time and frequency channels, but are distinguished by the base station on the basis of spatial channels, this first mode of operation may cause co-channel interference for one ore more of such remote user terminals. As such, the first mode of operation may provide the strongest signal to a desired remote user terminal, while subjecting the other remote user terminals in the range of the transmitting base station to a relatively high level of co-channel (or even adjacent channel) interference.

In a second mode of operation, the base station may perform beamforming such that relatively less gain is directed to the desired remote user terminal and the amount of nulling, relative to the first mode, is increased. Although the base station will transmit to the remote user terminal with less power, such power will typically be sufficient, depending on the threshold used to select between the two modes. Furthermore, in this second mode of operation, the interference experienced by other remote user terminals is relatively less than experienced in the first mode of operation where maximum overall power is generated toward the desired remote user terminal while a relatively small amount of nulling is performed.

In another embodiment of the invention, base station may generate nulls directed to one or more remote user terminals that are in communication with a second base station. As such, the first base station may diminish the effects of interference experienced by "stray" remote user terminals in communication with other base stations or other communication devices. The base station may determine the direction of stray remote user terminals by listening to their transmissions.

It will be appreciated that several modes in addition to the ones described may be employed in various embodiments of the invention. For example, each mode may provide various degrees of nulling directed by a base station or other communication device employing an antenna array toward one or more interfering sources and/or total power delivery directed by the base station toward a desired remote user terminal. The various degrees of nulling and/or transmission power to a desired remote user terminal will generally depend on the quality of communication (e.g., signal strength) experienced by the remote user terminal, as measured by the remote user terminal directly or as measured indirectly by the base station. In this embodiment, the greater the quality of communication, the greater the magnitude or number of interference mitigated regions generated by the base station. As such, a number of modes may be provided, each representing various amounts of nulling and/or power delivery, and depending on various thresholds of reception quality for at least one remote user terminal.

It will be appreciated that each of the elements depicted in the Figures and described above may be implemented in hardware, software, or a combination thereof. For example, in one embodiment, a processor (e.g., a digital signal processor, general purpose microprocessor, FPGA, ASIC, a combination thereof, etc.) that is configured to execute one or more routines to cause an offset between uplink signals associated with multiple remote user terminals and also to distinguish the remote user of interest based on such offset. In addition or in lieu thereof, delay circuitry, such as tapped delay line, may be used to delay downlink signals to relative to each other and thereby cause a relative offset between uplink signals. It should be appreciated that the invention may be employed exclusively in software, in one embodiment, to include a software module for causing offsets between uplink signal transmissions, and another software module to distinguish the uplink signals based on the relative offsets that caused therebetween. Such software modules may be stored in a data storage medium accessible by execution circuitry, such as one or more general purpose or digital signal processors or other data processing device(s). Therefore, it should be appreciated that the method of the present invention, and the elements shown in the Figures and described herein, may be implemented by hardware (e.g., circuitry), software, or a combination of hardware and software.

Although the invention has been described with reference to several embodiments, it will be appreciated that various alterations and modifications may be possible without departing from the spirit and scope of the invention, which is best understood by the claims that follow.

What is claimed is:

1. In a wireless communication system, a method comprising:
   obtainng an indication of signal reception quality for a first remote user terminal in communication with a communication device employing an antenna array;
   providing a first mode of operation for said communication device, said first mode of operation generating a first amount of nulling with respect to at least one interfering source;
   providing a second mode of operation for said communication device, said second mode of operation characterized by providing a second amount of nulling with respect to said at least one interfering source, wherein said second amount of nulling is relatively greater than said first amount of nulling; and
   based on said indication, said communication operating in one of said first and said second modes.

2. The method of claim 1, wherein said amount of nulling is defined by the quantity of nulls generated by said communication device, such that the quantity of nulls generated in said second mode of operation is greater than the quantity of nulls generated in said first mode of operation.

3. The method of claim 1, wherein said amount of nulling is defined by the intensity of at least one null generated by said communication device, such that the intensity of at least one null generated in said second mode of operation is greater intensity of at least one null generated in said second mode of operation is greater than the intensity of said at least one null generated in said first mode of operation.

4. The method of claim 1, wherein said amount of nulling is defined both by the number of nulls generated in each of said first and second modes of operation and the intensity of at least one null generated in said first and second modes of operation.

5. The method of claim 1, wherein said indication is defined by a relative signal strength of a downlink signal transmitted by said communication device to said first remote user terminal, said relative signal strength measured by said first remote user terminal.

6. The method of claim 5, further comprising:
   said first remote user terminal providing said indication to said communication device as information contained in an uplink signal.

7. The method of claim 1, wherein said indication is defined by a relative signal strength of an uplink signal transmitted by said first remote user terminal to said communication device, said relative signal strength measured by said communication device.

8. The method of claim 1, wherein said first interfering source comprises a second remote user terminal in communication with said communication device.

9. The method of claim 8, further comprising:
   said first and second remote user terminals simultaneously sharing a communication channel comprising a carrier frequency.

10. The method of claim 8, further comprising:
    said first and second remote user terminals simultaneously using adjacent channels of communication.

11. The method of claim 1, wherein said first interfering source comprises a second remote user terminal, said communication device comprising a first base station coupled to a communication network, said second remote user terminal in communication with a second base station coupled to said network.

12. The method of claim 11, further comprising:
    said first and second remote user terminals simultaneously sharing a communication channel comprising a carrier frequency.

13. The method of claim 1, further comprising:
    determining said indication at a predetermined time interval.

14. The method of claim 1, further comprising:
    said communication device determining said indication upon said communication receiving an uplink signal from said first remote user terminal.

15. The method of claim 1, further comprising:
said first remote user terminal receiving a plurality of downlink signals from said communication device; and
said first remote user terminal transmitting said indication to said communication device for each of said plurality of downlink signals.

16. A communication device, comprising:
an antenna array to transfer uplink signals and downlink signals with a first remote user terminal in communication with the communication device, and to null at least one interfering source;
a processor, coupled to the antenna array, to process the uplink and downlink signals transferred between the first remote user terminal and the communication device; and
a selector, coupled to the processor, to select a first mode of operation for said communication device when reception quality of said first remote user terminal is below a threshold, and to select a second mode of operation for said communication device when reception quality of said first remote user terminal is above the threshold, the second mode of operation characterized by providing an increased amount of nulling toward the interfering source relative to the amount of nulling directed toward the interfering source in the first mode of operation.

17. The communication device of claim 16, further comprising a signal quality measurement unit to determine the reception quality for the first remote user terminal as a function of a measured strength of an uplink signal received by the antenna array from the first remote user terminal.

18. The communication device of claim 16, wherein the first remote user terminal comprises a signal quality measurement unit to determine the reception quality of a downlink signal received by the first remote user terminal from the communication device.

19. The communication device of claim 16, wherein the amount of nulling is defined by the number of nulls generated by the communication device in the first and second modes of operation, such that the number of null generated by the communication device in the second mode of operation exceeds the number of nulls generated by the communication device in the first mode of operation.

20. The communication device of claim 16, wherein the amount of nulling is defined by the intensity of at least one null generated by the communication device in the first and second modes of operation, such that the intensity of the at least one null generated by the communication device is greater exceeds the intensity of the at least one null generated by the communication device in the first mode of operation.

21. The communication device of claim 16, wherein interfering source comprises a second remote user terminal occupying a channel that causes interference to communication between the first remote user terminal and the second remote user terminal.

22. A machine-readable medium having store thereon a machine-executable instructions, that, when processed by a machine, cause the machine to perform a method comprising:
determining an indication of signal reception quality for a first remote user terminal in communication with a communication device employing an antenna array;
providing a first mode of operation for said communication device, said first mode of operation generating a first amount of nulling with respect to at least one interfering source;
providing a second mode of operation for said communication device, said second mode of operation characterized by providing a second amount of nulling with respect to said at least one interfering source, wherein said second amount of nulling is relatively greater than said first amount of nulling; and
based on said relative signal reception quality indication, said communication device selecting one of said first and said second modes of operation.

23. The machine-readable medium of claim 22, wherein said amount of nulling is defined by the quantity of nulls generated by said communication device, such that the quantity of nulls generated in said second mode of operation is greater than the quantity of nulls generated in said first mode of operation.

24. The machine-readable medium of claim 22, wherein said amount of nulling is defined by the intensity of at least one null generated by said communication device, such that the intensity of at least one null generated in said second mode of operation is greater than the intensity of said at least one null generated in said first mode of operation.

25. The machine-readable medium of claim 22, wherein said amount of nulling is defined both by the number of nulls generated in each of said first and second modes of operation and the intensity of at least one null generated in said first and second modes of operation.

26. The machine-readable medium of claim 22, wherein said indication is defined by a relative signal strength of a downlink signal transmitted by said communication device to said first remote user terminal, said relative signal strength measured by said first remote user terminal.

27. The machine-readable medium of claim 26, said method further comprising:
said first remote user terminal providing said indication to said communication device as information contained in an uplink signal.

28. The machine-readable medium of claim 22, wherein said indication is defined by a relative signal strength of an uplink signal transmitted by said first remote user terminal to said communication device, said relative signal strength measured by said communication device.

29. The machine-readable medium of claim 22, wherein said first interfering source comprises a second remote user terminal in communication with said communication device.

30. The machine-readable medium of claim 29, said method further comprising:
said first and second remote user terminals simultaneously sharing a communication channel comprising a carrier frequency.

31. The machine-readable medium of claim 29, said method further comprising:
said first and second remote user terminals simultaneously using adjacent channels of communication.

32. The method of claim 22, wherein said first interfering source comprises a second remote user terminal, said communication device comprising a first base station coupled to a communication network, said second remote user terminal in communication with a second base station coupled to said network.

33. The machine-readable medium of claim 32, said method further comprising:
said first and second remote user terminals simultaneously sharing a communication channel comprising a carrier frequency.

34. The machine-readable medium of claim 22, said method further comprising:

determining said indication at a predetermined time interval.

35. The machine-readable medium of claim 22, said method further comprising:

said communication device determining said indication upon said communication receiving an uplink signal from said first remote user terminal.

36. The machine-readable medium of claim 22, said method further comprising:

said first remote user terminal receiving a plurality of downlink signals from said communication device; and said first remote user terminal transmitting said indication to said communication device for each of said plurality of downlink signals.

\* \* \* \* \*